United States Patent [19]
Denny et al.

[11] Patent Number: 5,573,263
[45] Date of Patent: Nov. 12, 1996

[54] AUTOMATIC TRAILER HITCH LOCK

[75] Inventors: Martin L. Denny, Des Moines, Iowa; Alan Maddaford, Farmington Hills, Mich.

[73] Assignee: DICO, Inc., Des Moines, Iowa

[21] Appl. No.: 271,799

[22] Filed: Jul. 7, 1994

[51] Int. Cl.⁶ .................................................. B60D 1/06
[52] U.S. Cl. ........................................... 280/509; 280/512
[58] Field of Search ...................................... 280/512, 511, 280/513, 514, 508, 509

[56] References Cited

U.S. PATENT DOCUMENTS

| | | | |
|---|---|---|---|
| 2,855,222 | 10/1958 | Bolmes et al. | 280/512 |
| 3,567,253 | 3/1971 | De Puydt et al. | 280/512 |
| 3,830,580 | 8/1974 | Slattery et al. | 280/512 X |
| 4,239,252 | 12/1980 | Huetsch et al. | 280/512 X |
| 4,416,467 | 11/1983 | Bradley | 280/512 |
| 4,817,979 | 4/1989 | Goettker | 280/512 |
| 5,344,174 | 9/1994 | Sanders | 280/511 X |

FOREIGN PATENT DOCUMENTS

| | | | |
|---|---|---|---|
| 1780688 | 8/1974 | Germany | 280/512 |
| 2140614 | 1/1983 | Germany | 280/512 |

*Primary Examiner*—Eric D. Culbreth
*Assistant Examiner*—F. Zeender
*Attorney, Agent, or Firm*—Brian J. Laurenzo; Kent A. Herink

[57] ABSTRACT

A self-latching trailer hitch for securing and releasing a hitch ball attached to a towing vehicle. The hitch maintains itself in a ball receiving position and when placed over the hitch ball, automatically locks into a ball securement position without the need for manual manipulation of a locking device. The hitch is provided with a release handle so that the hitch may be quickly and easily released from the hitch ball.

12 Claims, 2 Drawing Sheets

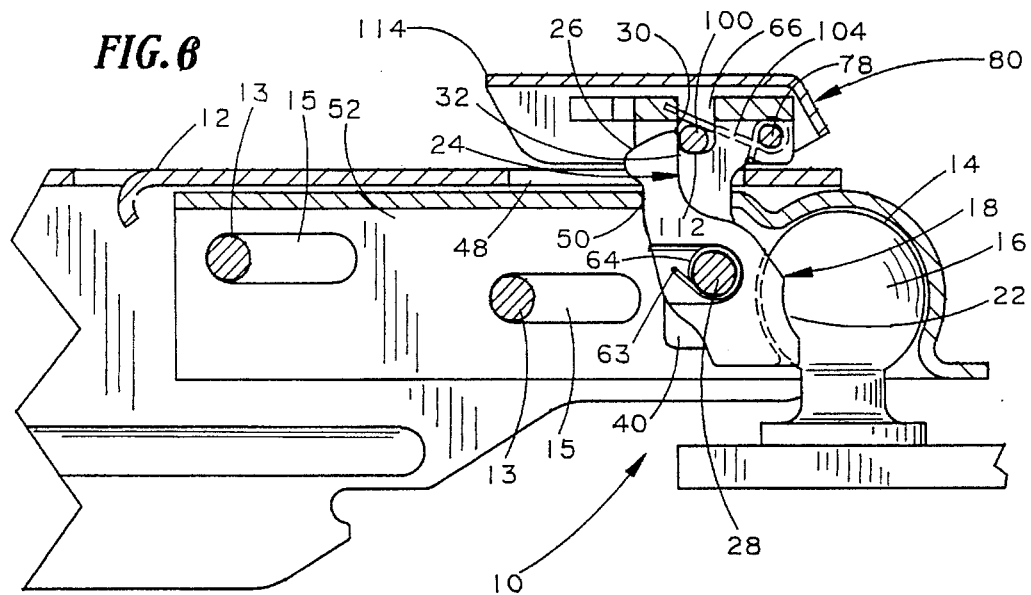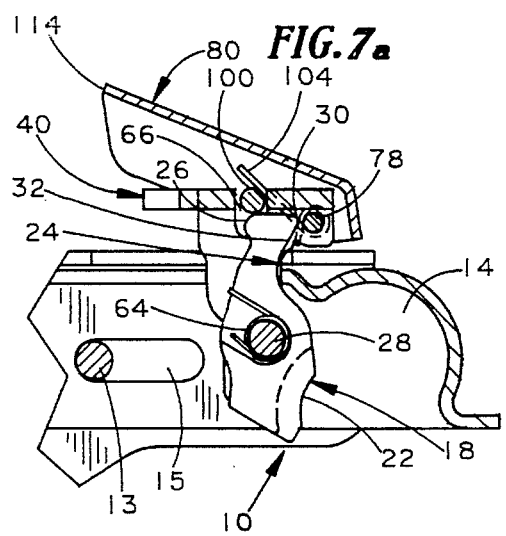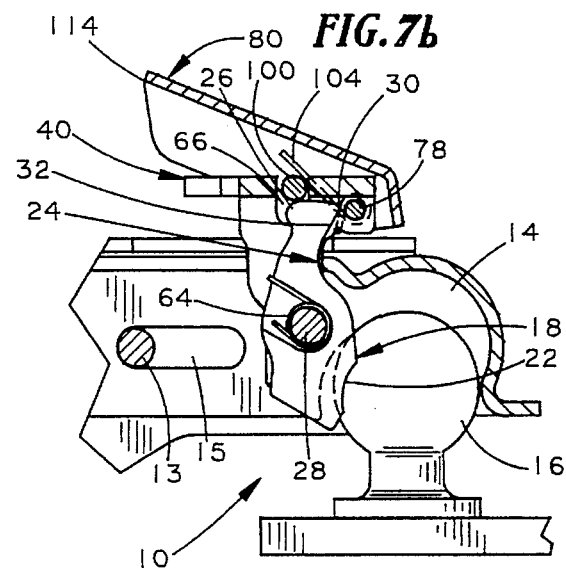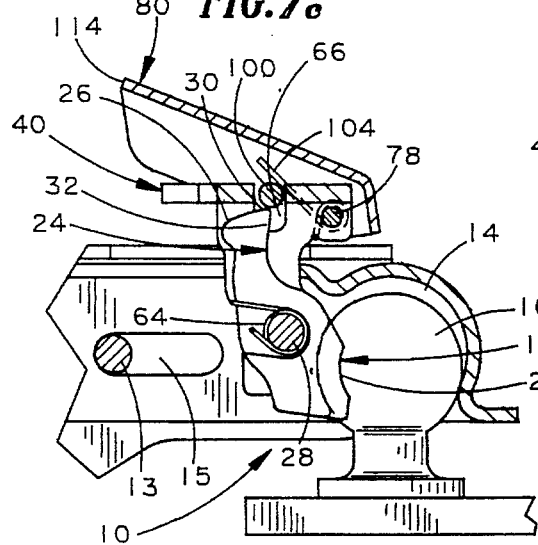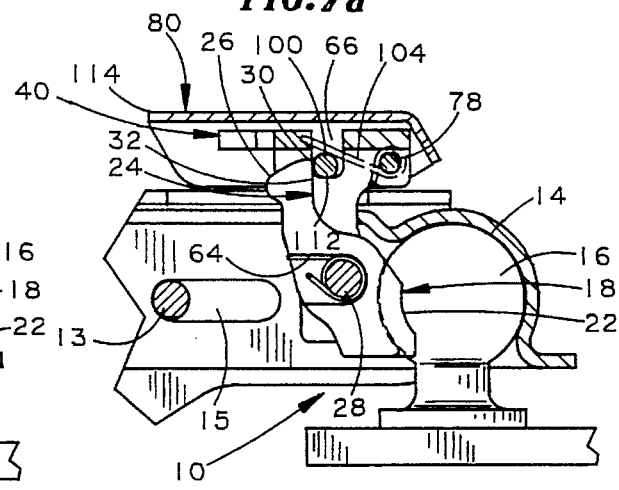

AUTOMATIC TRAILER HITCH LOCK

BACKGROUND OF THE INVENTION

The present invention relates generally to trailer hitches and, more particularly, to a trailer hitch which automatically locks on a hitch ball when the hitch ball is placed within the socket of a coupler, to prevent unintentional dislocation of the ball from the socket as the trailer is being pulled.

Automatic trailer hitch locks are known in the art. These mechanisms generally operate through the use of a friction cam or similar device which wedges against a portion of the housing of a coupler as a socket is placed over a hitch ball. This friction lock mechanism reduces the chance of the hitch ball inadvertently becoming dislodged from the coupler during transport of a trailer. An example of such a device is shown in U.S. Pat. No. 4,239,252, wherein a two-piece socket, having a fixed forward piece and a rear piece which pivots from a ball release position to a ball engagement position. The rear piece is disposed toward the ball engagement position by a spring or similar resilient means. To place a ball within the two-piece socket, a handle or similar mechanism must be lifted to move the rear unit into a ball receiving position before the ball is inserted into the two-piece socket. As the ball is placed within the two-piece socket, the rear unit "automatically" moves into the ball receiving position and a cam, or similar friction mechanism, locks the rear unit in the ball securing position. This automatic locking action prevents the ball from becoming inadvertently dislodged from the two-piece socket as the trailer is being pulled.

Generally, the friction lock alone is not safe for transport of a trailer. A handle or similar mechanism typically must be manually depressed after the automatic friction lock has been engaged to positively secure the socket around the ball. The trailer then may be transported without fear of the friction lock mechanism accidentally becoming dislodged during transport.

Although such mechanisms are generally adequate for receiving and securing a hitch ball within a socket, they are often complicated and cumbersome to use. The handle must be kept elevated as the socket is placed over the ball, leaving a user with only a single arm to lift and maneuver the trailer hitch onto the ball. Furthermore, if the user forgets to positively secure the handle in the downward locked position, only a friction connection means between a cam and the hitch housing prevents the socket from becoming inadvertently dislodged from the hitch ball during transport.

The difficulties encountered in the prior art discussed hereinabove are substantially eliminated by the present invention.

SUMMARY OF THE INVENTION

Accordingly, it is an object of the present invention to provide an automatic trailer hitch lock capable of maintaining itself in a ball receiving position.

It is another object of the present invention to provide an automatic trailer hitch lock which, upon reception of a hitch ball, automatically locks the hitch ball securely enough to substantially eliminate the possibility of the hitch ball becoming inadvertently dislocated from the hitch during trailering.

Still another object of the present invention is to provide an automatic trailer hitch lock which moves into a ball receiving position when released.

By the present invention, it is proposed to overcome the difficulties encountered heretofore. To this end a self-latching trailer hitch is provided for engaging and securing a hitch ball. The hitch has a socket which is capable of engaging the hitch ball upon insertion of the hitch ball into the socket. The hitch is also capable of automatically securing the hitch ball for operational trailering. The hitch includes a ball catch and support means operably and pivotally attached to the ball catch by pivot means for alternatively supporting the ball catch in a release position, and permitting the ball catch to pivotally rotate to a securement position upon insertion of the hitch ball into the socket. The support means includes bias means operably interposed between the support means and the ball catch for maintaining the ball catch in the release position. The pivot means enables the ball catch to pivot upon insertion of the hitch ball into the socket, upon overcoming the bias means, toward repositioning the ball catch to the securement position. The hitch is also provided with automatic locking means operably positioned between the ball catch and the support means for automatically locking the ball catch into the securement position, upon insertion of the hitch ball into the socket, relative to the support means to preclude against inadvertent migration and repositioning of the ball catch from the securement position. Release means are also operably connected to the automatic locking means for releasing the automatic locking means and allowing the bias means to pivot the ball catch, upon removal of the hitch ball out of the socket, toward repositioning the ball catch to the release position where the ball catch is maintained by the bias means.

Preferably, the automatic locking means are a strut capable of supporting a pin against lateral movement, while allowing the pin slidable movement in relationship to the strut. A torsion spring is connected between the ball catch and the support means to maintain the ball catch in the release position. The ball catch is preferably provided on one end with a catch which contacts the pin. The pin retains the ball catch in the securement position, and prevents the torsion spring from moving the ball catch into the release position. The release means are preferably a handle operably and pivotally connected to the strut and attached to the pin.

With the automatic locking means in the securement position, the handle is raised to move the pin out of engagement with the catch, which allows the torsion spring to pivot the ball catch and maintain the ball catch in the open position upon removal of the pulling ball from the socket. The automatic locking means is designed so that insertion of the pulling ball into the socket pivots the ball catch into the securement position, where the pin moves into engagement with the catch, thereby locking the pulling ball into the socket. To release the automatic locking means, the handle is raised to move the pin out of contact with the closed catch so that the socket may be removed from the pulling ball.

BRIEF DESCRIPTION OF THE DRAWINGS

In the drawings:

FIG. 6 is a side view in cross-section showing the automatic locking means of the present invention in the securement position; and FIGS. 7a, 7b, 7c, and 7d are side views, in cross-section showing the automatic locking means of the present invention as it is secured to a hitch ball.

DETAILED DESCRIPTION OF THE INVENTION

Figure 1:
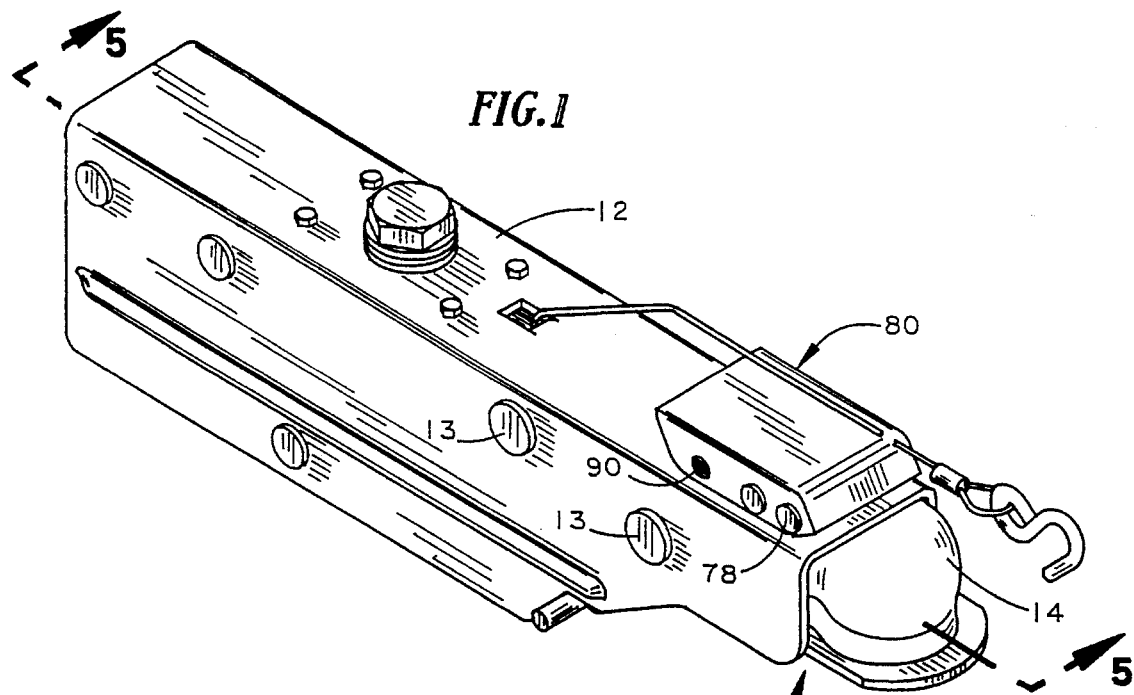
FIG. 1 is a perspective view of a trailer hitch incorporating the automatic locking means of the present invention.

The invention relates to an automatic trailer hitch lock mechanism 10 designed to engage and secure a hitch ball 16 within a socket 14 of a trailer hitch housing 12 without manual manipulation of the mechanism 10. The mechanism 10 is designed so that when it is desired to release the hitch ball 16 from the mechanism 10, a handle 80 is raised and the socket 14 is lifted off the hitch ball 16, leaving the socket 14 in a position to reengage the hitch ball 16.

Figure 5:
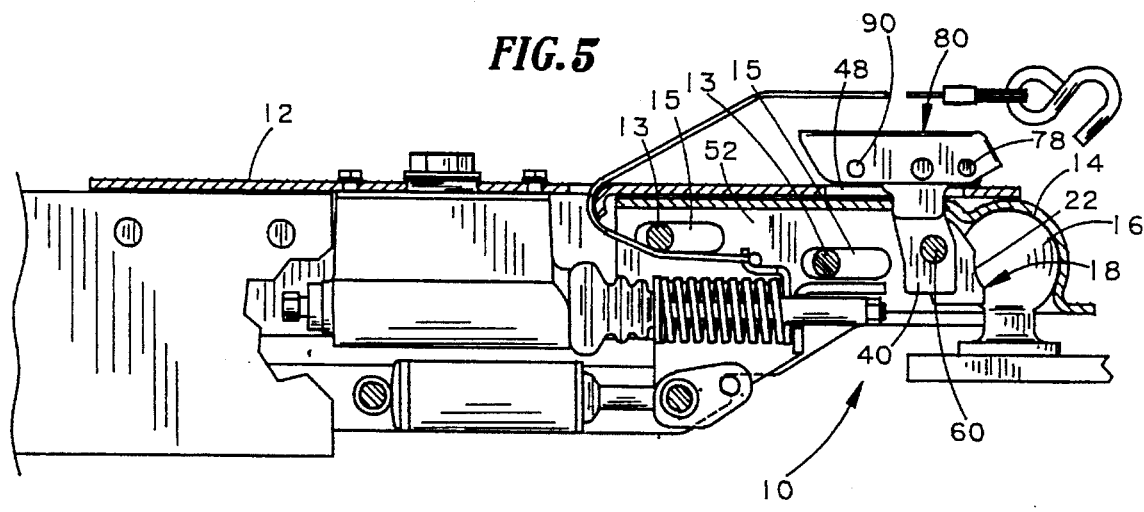
FIG. 5 is a side view in partial cross-section of a trailer hitch incorporating the automatic locking means of the present invention.

In the Figures, there is shown the automatic trailer hitch lock mechanism 10 provided within a socket 14 and further housed by the trailer hitch housing 12 (FIG. 5). The socket 14 is slidably connected to the housing 12 by means of support pins 13 passing through slots 15 in the socket 14 and secured to the housing 12. The housing 12 is preferably constructed of steel (FIG. 1). The interior of the socket 14 is of the same curvature as the exterior of the hitch ball 16 (FIG. 5). The curvature of the socket 14 is preferably 155 degrees, but should be no more than 180 degrees, to assure the ball 16 may be easily inserted into, and removed from, the socket 14.

Figure 3:
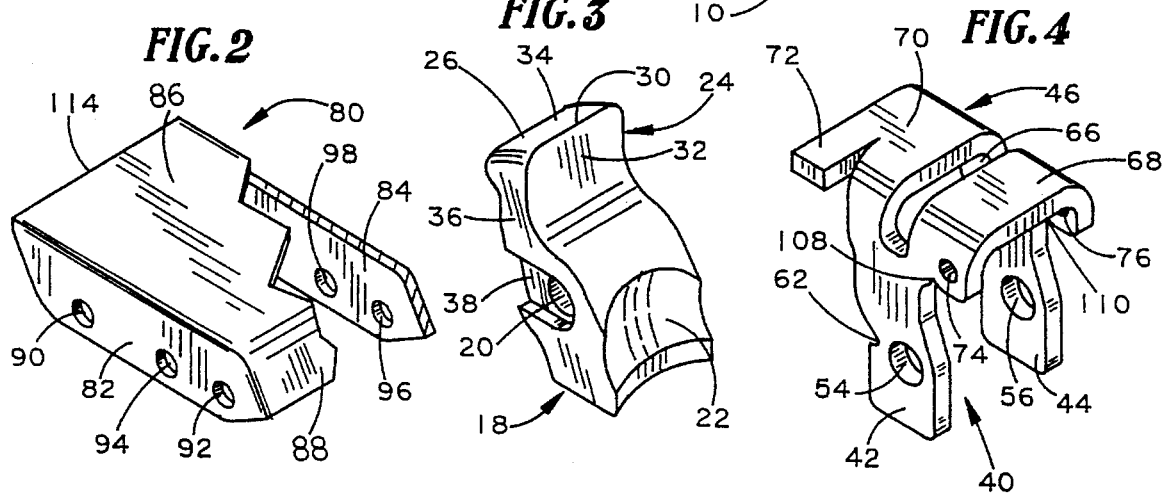
FIG. 3 is a perspective view of the ball catch of the present invention.

Pivotally connected to the socket 14 is a ball catch 18 (FIG. 6). The ball catch 18 has a ball lock 22 on one end (FIG. 3). On the other end of the ball catch 18 are a pin catch 24 and a pin rest 26. The ball catch is also provided with an aperture 20 passing through the middle of the ball catch 18. The ball lock 22 is preferably cast in a curvature identical to that of the surface of the hitch ball 16 (FIG. 5). The ball catch 18 pivots from a release position (FIG. 7a) to a securement position (FIG. 7d).

The pin catch 24 and pin rest 26 run the entire width of the ball catch 18 (FIG. 3). The pin rest 26 is a flat surface 34 along the top of the ball catch 18. The pin catch 24 has a ridge, forming almost a peak 30 and a face 32 which is nearly flat. One side 36 of the ball catch 18 is provided with a recess 38 around the aperture 20. The recess 38 has a semi-circular edge as well as a flat top and bottom which extend to the end of the side 36.

Figure 4:
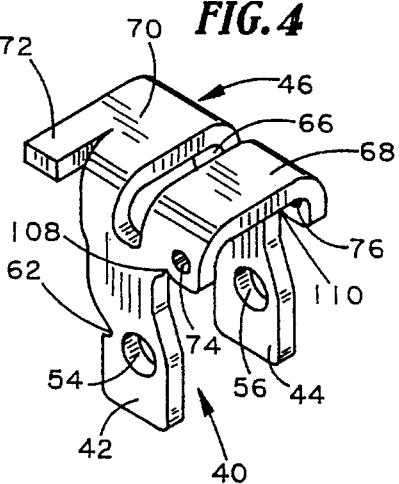
FIG. 4 is a perspective view of the strut of the present invention.

Secured to the socket 14 between the ball catch 18 and the walls 52 of the socket 14 is a strut 40 (FIG. 6). The strut 40 is preferably constructed of a U-shaped piece of steel having a pair of legs 42 and 44 and a top 46 (FIG. 4). The legs 42 and 44 extend downward through an aperture 48 provided in the housing 12, and through aperture 50 in the socket 14 (FIGS. 4, 5 and 6). The legs 42 and 44 are secured to the walls 52 of the socket 14 by weldments or similar securement means (FIGS. 4–5). The legs 42 and 44 are preferably provided with apertures 54 and 56 which are aligned with a pair of apertures 60 provided in the walls 52 of the socket 14 (FIGS. 4 and 5). These apertures 54, 56, and 60 are provided for a rotation pin 28 passing through the aperture 20 of the ball catch 18 (FIGS. 4, 5 and 6).

One of the legs 42 is provided with a notch 62 along the rear side of the leg 42 (FIG. 4). The notch 62 is preferably provided just above the center line of the leg aperture 54. The notch 62 is provided to secure one end 63 of a torsion spring 64 (FIGS. 4 and 6). The torsion spring 64 extends from the notch 62, wraps around the rotation pin 28, within the recess 38, and extends along the substantially flat top wall of the recess 38 to bias the ball catch 18 toward the release position (FIGS. 3, 4 and 6).

The top 46 of the strut 40 is provided with a pin slot 66 which divides the top 46 into a forward portion 68 and a rearward portion 70 (FIG. 4). The rearward portion 70 is provided with a finger 72 which extends just beyond the side of the strut leg 42. Near the forward portion 68 of the strut top 46, the strut legs 42 and 44 are provided with holes 74 and 76 to allow the insertion of a handle pin 78 through the holes 74 and 76 (FIGS. 4 and 6).

Figure 2:
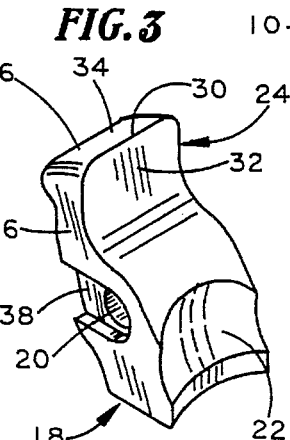
FIG. 2 is a perspective view in partial cut-away of the handle of the present invention.

The handle 80 is provided with a pair of sidewalls 82 and 84, a top 86, and a front 88 (FIG. 2). One sidewall 82 is provided with a lock hole 90, a pivot hole 92, and a pin hole 94. The opposing sidewall 84 is provided with a pivot hole 96 and a pin hole 98. The pivot holes 92 and 96 of the handle 80 are aligned with the holes 74 and 76 provided in the strut 40 and the handle pin 78 is placed through all of the holes 92, 74, 76, and 96 (FIGS. 2, 4 and 6). The handle 80 is thereby capable of pivoting in relationship to the strut 40.

A lock pin 100 is provided through the pin holes 94 and 98 and rests in the pin slot 66 of the strut 40 (FIGS. 2, 4 and 6). The pin slot 66 is of a slightly larger width than the diameter of the lock pin 100 so that the pin 100 may pass along a slightly arcuate path within the slot 66 as the handle 80 is raised and lowered. The lock hole 90 provided on the handle 80 is positioned just below the finger 72 of the strut 40 when the handle 80 is in the downward position (FIG. 6).

Wrapped around the handle pin 78 between the handle 80 and the strut 40 is a double torsion spring 104 (FIG. 6). The strut 40 is provided with a pair of notches 108 and 110 which allow the connecting portion of the double torsion spring 104 to be held in place during movement of the handle 80 (FIGS. 2, 4 and 6). The double torsion spring 104 wraps around the handle pin 78 and extends over the lock pin 100, thereby biasing the lock pin 100 downward.

Operation of the automatic lock mechanism 10 is accomplished with the mechanism 10 initiated in the ball receiving position (FIG. 7a). In this position, the ball lock 22 of the ball catch 18 is pivoted rearward and the pin catch 24 is pivoted forward. The lock pin 100 rests on the pin rest 26. The ball catch torsion spring 64 maintains the ball catch 18 in the release position.

The socket 14 is placed over the pulling ball 16 and the socket 14 is lowered so that the pulling ball 16 moves into the socket 14 (FIG. 7b). As the ball 16 contacts the ball lock 22, the lock pin 100 moves along the pin rest 26 and over the peak 30 of the pin catch 24 as the ball 16 fully engages the socket 14 (FIGS. 7b and 7c). Once the lock pin 100 has moved around the peak 30 of the pin catch 24, the torsion springs 104 force the lock pin 100 to the bottom 112 of the pin slot 66 (FIG. 7d). Once the hitch ball 16 fully engages the socket 14, the ball lock 22 has moved around the circumference of the hitch ball 16 so that a portion of the ball lock 22 engages the surface of the hitch ball 16 below the center line of the hitch ball 16 (FIG. 7d).

Just as the ball lock 22 is constructed to contact the surface of the hitch ball 16 below the center line of the hitch ball 16, the socket 14 may optionally be constructed to engage the surface of the hitch ball 16 below the center line of the hitch ball 16 to aid in preventing the hitch ball 16 from being removed from the socket 14, until the ball lock 22 is pivoted out of contact with the surface of the hitch ball 16. In another alternative embodiment, the mechanism 10 may be designed so that only the socket 14 engages the hitch ball 16 below the center line of the hitch ball 16, while the ball lock 22 merely maintains the ball in engagement with the socket 14. In all of these embodiments it is desirable to have some portion of the mechanism 10 contact the hitch ball 16 below the center line of the hitch ball 16, to prevent the socket 14 from inadvertently lifting up and off of the hitch ball 16.

The face 32 of the pin catch 24 provides a surface substantially parallel to the wall of the pin slot 66 to prevent the pin 100 from inadvertently sliding over the peak 30 and releasing the ball catch 18 when the ball catch 18 is in the securement position (FIG. 6). The combination of the sharp peak 30 and the torsion springs 104 make it highly unlikely that the pin 100 would inadvertently rise over the peak 30 and allow the ball catch 18 to pivot into the ball release position.

When it is desired to release the hitch ball 16, the rear 114 of the handle 80 is lifted thereby moving the pin 100 out of the slot 66 (FIG. 7c). Once the pin 100 has been raised over the peak 30 of the pin catch 24, the ball catch torsion spring 64 pivots the ball catch 18. As the ball catch 18 pivots, the ball lock 22 moves out of engagement with the surface of the hitch ball 16 (FIG. 7b). The socket 14 may then be raised off of the hitch ball 16 as the ball catch 18 pivots to release the hitch ball 16. The ball catch torsion spring 64 assures that the ball catch 18 rotates enough to allow the lock pin 100 to rest on the pin rest 26. The ball catch 18 is then maintained in the release position by the ball catch torsion spring 64 (FIG. 7a).

If it is desired to prevent unauthorized use of the mechanism 10, a standard shackle lock (not shown) may be inserted through the lock hole 90 (FIG. 5). The shackle of the lock protrudes through aperture 90 in the handle 80 and under the finger 72. Any attempt to raise the handle 70 is foiled by the finger 72 which contacts the shackle, and prevents the handle 80 from being raised far enough to allow the lock pin 100 to move out of engagement with the pin catch 24.

The foregoing description and drawings merely explain and illustrate the invention. The invention is not limited thereto, except insofar as the claims are so limited, as those skilled in the art who have the disclosure before them will be able to make modifications and variations therein without departing from the scope of the invention.

What is claimed is:

1. A self-latching trailer hitch for engaging and securing a hitch ball, in which a socket of said hitch is capable of engaging the hitch ball upon insertion of the hitch ball into the socket as well as is capable of automatically securing the hitch ball for transport, said self-latching trailer hitch comprising:

a ball catch;

support means operably and pivotally attached to said ball catch by pivot means for alternatively supporting said ball catch in a release position, and permitting said ball catch to pivotally rotate to a securement position upon insertion of the hitch ball into the socket;

said support means including bias means operably interposed between said support means and said ball catch for maintaining said ball catch in said release position;

said pivot means enabling said ball catch to pivot, upon insertion of the hitch ball into the socket and upon overcoming said bias means, toward repositioning said ball catch to said securement position;

automatic locking means operably positioned between said ball catch and said support means for automatically and positively locking said ball catch into said securement position, upon insertion of the hitch ball into the socket, relative to said support means to preclude against inadvertent migration and repositioning of said ball catch from said securement position, said automatic locking means being a pin operably coupled to said hitch in a manner which allows said pin to move from a position resting upon said ball catch to a position interposed between said ball catch and said support means upon insertion of the hitch ball into the socket where by said ball catch is prevented from pivoting toward said release position; and release means operably connected to said automatic locking means for releasing said automatic locking means and allowing said bias means to pivot said ball catch upon removal of the hitch ball out of the socket, toward repositioning said ball catch to said release position, where said ball catch is maintained by said bias means.

2. The self-latching trailer hitch of claim 1, wherein said support means is a strut.

3. The self-latching trailer hitch of claim 2, wherein said pivot means is a pin passing through said ball catch and operably attached to said strut.

4. The self-latching trailer hitch of claim 1, wherein said bias means is a torsion spring operably connected between said support means and said ball catch.

5. A self-latching trailer hitch for engaging and securing a hitch ball to the trailer hitch as the hitch ball is used to pull the trailer hitch, in which the trailer hitch is capable of being maintained in a securement position when the trailer hitch is placed over the hitch ball, in which the securement position prevents the hitch ball from being inadvertently removed from the trailer hitch, the trailer hitch comprising:

a. socket means for operably, pivotally, and releasably attaching the hitch ball to the trailer hitch;

b. a ball catch operably and pivotally attached to said socket means in a manner which allows said ball catch to pivot from a release position to the securement position and from the securement position to said release position;

c. a pin;

d. catch means operably connected to said ball catch for engaging said pin to maintain said ball catch in said securement position;

e. a pin rest operably connected to said ball catch;

f. biasing means operably connected to said ball catch for biasing said ball catch into said release position;

g. a strut having a slot and operably connected to said socket means, wherein said pin is operably provided within said slot; and h. handle means operably connected to said pin for sliding said pin into and out of engagement with said catch means as said handle is lifted and released.

6. The self-latching trailer hitch of claim 5, further comprising handle biasing means operably connected to said handle means for biasing said pin into contact with said catch means when said ball catch is in the securement position and for biasing said pin into contact with said pin rest when said ball catch is in said release position.

7. The self-latching trailer hitch of claim 6, wherein said handle biasing means are a torsion spring.

8. A self-latching trailer hitch for engaging and securing a hitch ball, in which a socket of said hitch is capable of engaging the hitch ball upon insertion of the hitch ball into the socket as well as is capable of automatically securing the hitch ball for transport, said self-latching trailer hitch comprising:

a ball catch;

support means operably and pivotally attached to said ball catch by pivot means for alternatively supporting said ball catch in a release position, and permitting said ball catch to pivotally rotate to a securement position upon insertion of the hitch ball into the socket;

said support means including bias means operably interposed between said support means and said ball catch for maintaining said ball catch in said release position;

said pivot means enabling said ball catch to pivot, upon insertion of the hitch ball into the socket and upon overcoming said bias means, toward repositioning said ball catch to said securement position;

automatic locking means operably positioned between said ball catch and said support means for automatically and positively locking said ball catch into said securement position, upon insertion of the hitch ball into the socket, relative to said support means to preclude against inadvertent migration and repositioning of said ball catch from said securement position; and release means operably connected to said automatic locking means for releasing said automatic locking means and allowing said bias means to pivot said ball catch upon removal of the hitch ball out of the socket, toward repositioning said ball catch to said release position, where said ball catch is maintained by said bias means, said release means being a handle operably connected to said automatic locking means and pivotally connected to said support means in a manner which allows said automatic locking means to be removed from a position between said ball catch and said support means upon pivoting of said handle.

9. The self-latching trailer hitch of claim 8, wherein said support means is a strut.

10. The self-latching trailer hitch of claim 9, wherein said pivot means is a pin passing through said ball catch and operably attached to said strut.

11. The self-latching trailer hitch of claim 8, wherein said bias means is a torsion spring operably connected between said support means and said ball catch.

12. The self-latching trailer hitch of claim 8, wherein said automatic locking means is a pin operably coupled to said hitch in a manner which allows said pin to move from a position resting upon said ball catch to a position interposed between said ball catch and said support means upon insertion of the hitch ball into the socket, whereby said ball catch is prevented from pivoting toward said release position.

* * * * *